United States Patent
Hoshino (10) Patent No.: US 6,736,109 B2
(45) Date of Patent: May 18, 2004

(54) KNOCK CONTROL SYSTEM

(75) Inventor: Masato Hoshino, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/444,731

(22) Filed: May 27, 2003

(65) Prior Publication Data

US 2003/0230281 A1 Dec. 18, 2003

(30) Foreign Application Priority Data

Jun. 12, 2002 (JP) ........................................ 2002-170744

(51) Int. Cl.[7] ................................................. F02P 5/00
(52) U.S. Cl. ............................ 123/406.29; 123/406.38; 73/35.09
(58) Field of Search ................... 123/406.29, 406.34, 123/406.35, 406.38; 73/35.09

(56) References Cited

U.S. PATENT DOCUMENTS 5,287,837 A * 2/1994 Hashimoto et al. .... 123/406.29
6,520,149 B2 * 2/2003 Kokubo et al. ........ 123/406.37

FOREIGN PATENT DOCUMENTS

| JP | 2000-205096 A1 | 7/2000 |
| JP | 2002-089303 A1 | 3/2002 |
| JP | 2002-089341 A1 | 3/2002 |

* cited by examiner

*Primary Examiner*—Bibhu Mohanty
(74) *Attorney, Agent, or Firm*—Shinjyu Global IP Counselors, LLP (57) ABSTRACT

A knock control system is configured to precisely determine situations in which the knock signal cannot be detected and to suppress the occurrence of reductions in fuel efficiency, exhaust performance, and output performance. The knock control system has a knock sensor that detects an engine knocking condition to produce a knock signal of a prescribed level and a variable valve mechanism that can change the intake valve closing timing. Based on the ratio of the estimated knock signal during knocking to the estimated noise signal during no knocking, the knock control system determines if an accurate knock signal can be detected. The knock control system also determines if the valve seating position corresponding to the intake valve closing timing is within the knock detection interval and, if so, the estimated mechanical noise component of the estimated noise signal is updated.

16 Claims, 6 Drawing Sheets

KNOCK CONTROL SYSTEM

BACKGROUND OF THE INVENTION

1. Field of the Invention

The present invention generally relates to a knock control system that suppresses knocking in a spark ignition type of internal combustion engine. More specifically, the present invention relates to a knock control system used in an internal combustion engine that is equipped with a variable valve mechanism that changes the closing timing of the intake valves.

2. Background Information

A knock control system is disclosed in Japanese Laid-Open Patent Publication No. 2000-205096 that suppresses the occurrence of knocking in a spark ignition internal combustion engine that compresses a mixture of air and fuel, and then ignites the mixture with a spark plug. In a well-known manner, the knock control system uses feedback-control to adjust the ignition timing based on a knock signal of a prescribed level outputted from a knock sensor.

In view of the above, it will be apparent to those skilled in the art from this disclosure that there exists a need for an improved knock control system. This invention addresses this need in the art as well as other needs, which will become apparent to those skilled in the art from this disclosure.

SUMMARY OF THE INVENTION

It has been discovered that, in the above mentioned knock control system, if the signal-to-noise ratio S/N is poor, there is the risk that knocking will be detected incorrectly when knocking is not occurring or that knocking will fail to be detected when knocking is actually occurring. In particular, when the intake valve closing timing overlaps with the knock detection interval, the signal-to-noise ratio S/N degrades considerably due to vibrations and noise that occur when the intake valve returns to the seated position. Furthermore, in an internal combustion engine equipped with a variable valve mechanism that can vary the closing timing of the intake valves, the degree of overlap between the intake valve closing timing and the knock detection interval changes depending on the intake valve closing timing.

The present invention was conceived in view of these problems. One object of the present invention is to improve fuel efficiency and exhaust performance by precisely determining situations in which the knock signal cannot be accurately and easily detected, i.e., situations in which knock control cannot be executed, and reducing as much as possible the occurrence of situations in which knock control cannot be executed.

In accordance with one aspect of the present invention, a knock control system for an internal combustion engine is provided that comprises a variable valve mechanism, a knock detector, a signal-to-noise ratio estimating section, an estimated noise signal updating section, a knock detectability determining section, and a knock control section. The variable valve mechanism is configured and arranged to change at least an intake valve closing timing. The knock detector is configured to output a knock signal indicative of the engine knocking condition during a knock detection interval. The signal-to-noise ratio estimating section is configured to estimate a signal ratio based on at least one of an engine rotational speed and an engine load. The signal ratio is a ratio of an estimated knocking signal estimated when the engine knocking condition is occurring and an estimated noise signal estimated when the engine knocking condition is not occurring. The estimated noise signal updating section is configured to update the estimated noise signal depending upon on the intake valve closing timing. The knock detectability determining section is configured to determine if the knock signal can be detected or not based on the signal ratio. The knock control section is configured to execute knock control based on the knock signal when the knock detectability determining section determines the knock signal can be detected.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
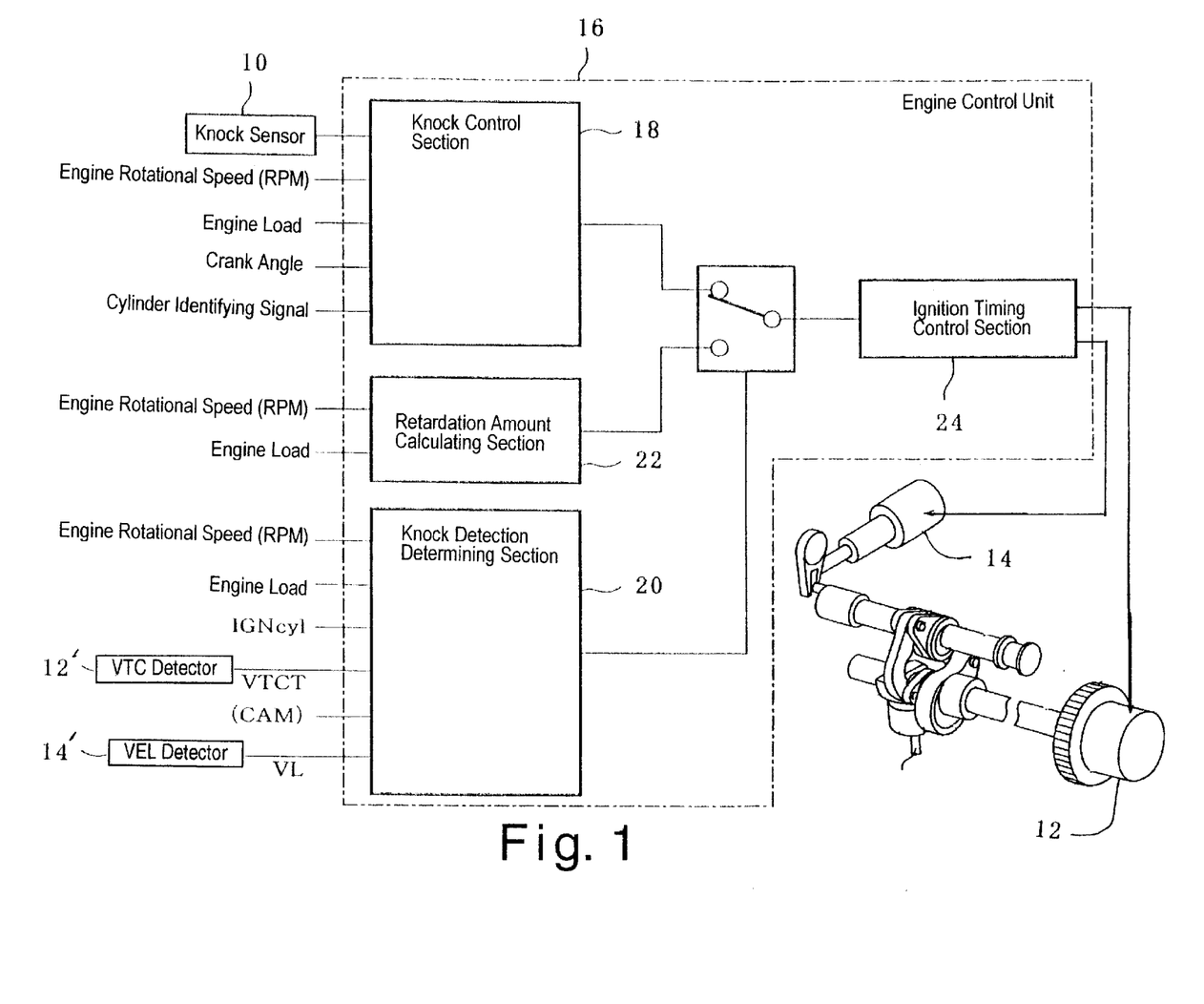
FIG. 1 is a simplified block diagram illustrating in a simple manner an internal combustion engine knock control system in accordance with a first embodiment of the present invention.

Referring initially to FIG. 1, an internal combustion engine knock control system is illustrated in a simplified manner accordance with a first embodiment of the present invention. Specifically, FIG. 1 is a block diagram that illustrates in a simple manner the internal combustion engine knock control system in accordance with the present invention. The internal combustion engine is provided with a knock sensor 10 that acts as a knock detecting device that can detect vibrations inside a combustion chamber where knocking is occurring. It is also provided with a variable valve timing control mechanism (VTC) 12 that can vary in a continuous manner the phase of the lift centerline angle of each of the intake valves with respect to the crank angle. Also a variable valve lift and actuation angle changing mechanism (VEL) 14 is provided that can vary in a continuous manner the actuation angle and valve lift amount of each of the intake valves. These two mechanisms act as a variable valve mechanism that can change the intake valve lift characteristics, including the intake valve closing timing (IVC).

The knock sensor 10 is a conventional component that is well known in the art. Since knock sensors are well known in the art, the knock sensor 10 used in the present invention will not be discussed or illustrated in detail herein. Basically, the knock sensor 10 converts engine vibrations, such as knocking and pinging, into electrical signals. The electrical signals outputted from the knock sensor 10 include background noise from the engine in addition to the knocking and pinging vibrations that occur during knocking. When the engine knocking condition is not occurring, the knock sensor 10 outputs a noise signal that represents the background noise that continuously occurs. When the engine knocking condition is occurring, the electrical signal outputted from the knock sensor 10 increases due to the knocking and pinging vibrations in addition to the background noise. Thus, the background noise portion of the electrical signal outputted from the knock sensor 10 during engine knocking needs to be consider in determining whether knocking is actually occurring. In other words, when the electrical signal outputted from the knock sensor 10 exceeds a prescribed output level, then the electronic control unit 16 determines that the engine is knocking, as described below in more detail. Thus, the knock sensor 10 is configured to detect an engine knocking condition and to produce a knock signal indicative of the engine knocking condition, which is received by the electronic control unit 16. Upon receiving these signals from the knock sensor 10, the electronic control unit 16 can retard the ignition timing to correct the knocking condition, as described below in more detail.

Figure 2:
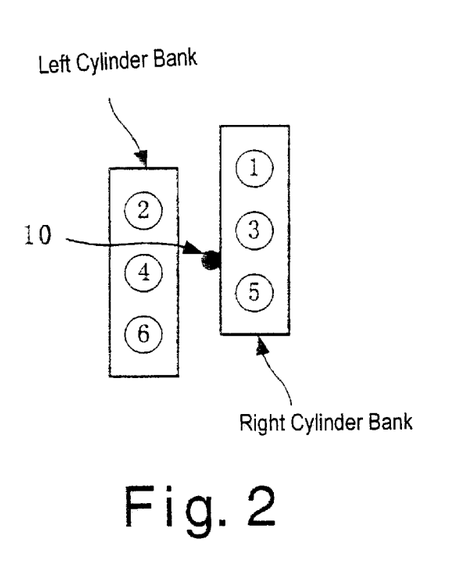
FIG. 2 is a simplified diagrammatic view of a V-6 engine showing an example of a knock sensor arrangement.
Figure 3:
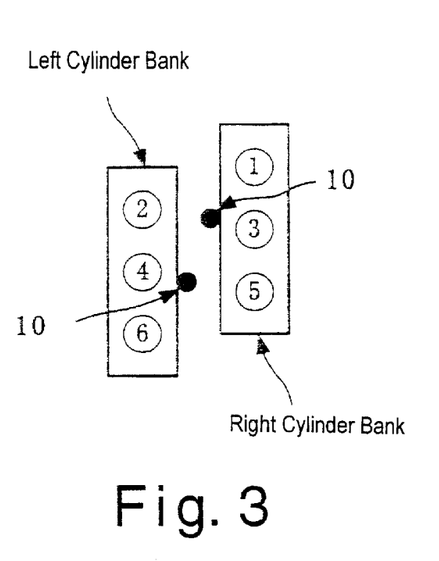
FIG. 3 is a simplified diagrammatic view of a V-6 engine showing an example of a knock sensor arrangement.

The knock sensor 10 is preferably a pickup sensor that is mounted to the cylinder block and detects vibrations. In a V-6 engine, for example, the pickup or knock sensor 10 can be installed in one location (one bank only) as shown in FIG. 2. Alternatively, two pickup or knock sensors 10 and 10 can be installed in two different locations (one per bank) as shown in FIG. 3. In either case, the knock sensor 10 is installed on the inside of the bank where the intake valves are arranged. When more than one knock sensor 10 is installed, the knock sensor 10 that will be used for each cylinder is established in advance and not changed because there is little effect on the detection precision when the knock sensor 10 used with respect to a given cylinder is changed according to the operating conditions. For example, in the example shown in FIG. 3, one of the knock sensors 10 is installed on the right bank for detecting vibrations in cylinders #1, #3, and #5 of the right bank, and the other knock sensor 10 is installed on the left bank for detecting vibrations in cylinders #2, #4, and #6 of the left bank.

The mechanisms 12 and 14 are disclosed in more detail in Japanese Laid-Open Patent Publication No. 2002-89303 and Japanese Laid-Open Patent Publication No. 2002-89341. Thus, the mechanisms 12 and 14 will now be described only briefly. The variable valve timing control mechanism 12 uses a helical spline or a vane to rotate the camshaft relative to a cam sprocket or cam pulley that rotates in coordination with the crankshaft. The lift and actuation angle changing mechanism 14 uses a rocker arm to mechanically link a rocking cam for driving the intake valves to the camshaft and changes the actuation angle and lift amount of the intake valves in a continuous manner by changing the position of the fulcrum point center of the rocker arm. Instead of a lift and actuation angle changing mechanism, it is also acceptable to use a cam switching mechanism that switches among a plurality of cams having different valve lift characteristics.

The engine control unit 16 is a conventional component that is well known in the art. Since engine control units are well known in the art, the engine control unit 16 will not be discussed or illustrated in detail herein. Basically, the engine control unit 16 of the knock control system includes a microcomputer with a knock control program that controls knocking in the engine as discussed below. The engine control unit 16 also includes other conventional components such as an input interface circuit, an output interface circuit, and storage devices such as a ROM (Read Only Memory) device and a RAM (Random Access Memory) device. The internal RAM of the engine control unit 16 stores statuses of operational flags and various control data. The internal ROM of the engine control unit 16 stores the various tables, maps, etc. for various operations. The engine control unit 16 is capable of selectively controlling any of the components of the engine in accordance with one or more control programs. It will be apparent to those skilled in the art from this disclosure that the precise structure and algorithms for the engine control unit 16 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The engine control unit 16 includes a knock control section 18, a knock detectability determining section 20, a retardation amount calculating section 22 and an ignition timing control section 24. Of course, it will be apparent to those skilled in the art from this disclosure that the engine control unit 16 can have other sections as needed and/or desired. The control unit 16 receives various input or detection signals from several engine operating condition detectors or sensors. These detectors or sensors are conventional components that are well known in the art. Since detectors or sensors are well known in the art, these structures will not be discussed or illustrated in detail herein.

Based on a knock signal of a prescribed level outputted from the knock sensor 10, the knock control section 18 executes a trace knock control, i.e., feedback control, of the ignition timing, whereby the ignition timing is advanced as much as possible within a range where knocking does not occur. More specifically, when the engine is in the knock detection interval, the ignition timing is retarded so as to quickly avoid knocking when the frequency of occurrence of knock signals exceeding a prescribed slice level that equals or exceeds a prescribed value. Preferably, the ignition timing is gradually advanced toward the advance limit when the frequency of occurrence of the knock signal is less than the prescribed value. In other words, the ignition timing of the engine is advanced to Minimum advance for the Best Torque (MBT) so as to improve the torque characteristics thereof. As is well known in the art, it is generally desired that the ignition timing of an internal combustion engine be set at a point to obtain so-called MBT (Minimum advance for Best Torque) from the points of engine efficiency and fuel consumption. This point will be simply referred to as the "MBT point" hereinafter. However, if the ignition timing is advanced toward the MBT point under certain engine conditions, knock occurs before the MBT point is reached. The knock detection interval and slice level are set for each cylinder based on the engine speed and engine load.

The knock detectability determining section 20 of the engine control unit 16 is configured to receive the engine rotational speed from a vehicle speed sensor (not shown), engine load from a throttle opening sensor (not shown), an ignition cylinder identifying signal from a ignition cylinder identifying sensor (not shown), a phase conversion angle advancement value (VTCT) from a VTC detector 12', and a valve lift amount signal from a VEL detector 14'.

Based on the engine speed and engine load, the knock detectability determining section 20 determines if the knock signal used for the trace knock control executed by the knock control section 18 can be detected accurately. When the knock detectability determining section 20 determines that an accurate knock signal cannot be detected, the retardation amount calculating section 22 calculates an ignition timing retardation amount based on the engine speed and load. The ignition timing control section 24 then controls the ignition timing based on the retardation amount set by the knock control section 18 or the retardation amount calculating section 22. In short, the knock control section 18 simply sets the amount of retardation with respect to the advance limit (MBT), and the ignition timing control section 24 controls the ignition timing based on this retardation amount.

Figure 4:
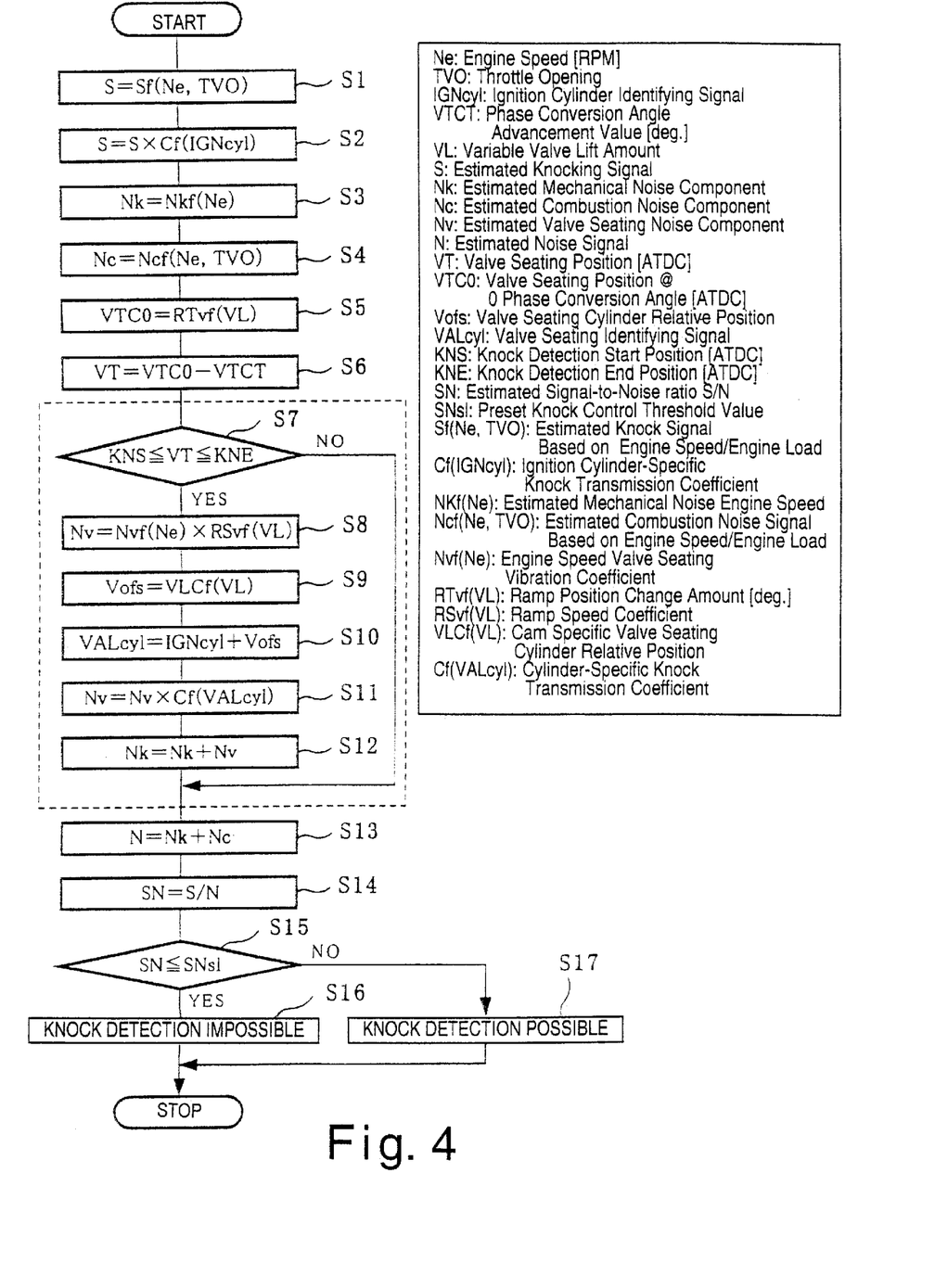
FIG. 4 is a flowchart showing the control steps executed by the knock control system in accordance with the first embodiment.

Referring now to FIG. 4, a flowchart is illustrated showing the control steps executed by the engine control unit 16 in a first embodiment of the present invention.

In step S1, the engine control unit 16 calculates an estimated knock signal S when knocking is occurring using an estimated knock signal map that is based on the engine speed Ne and engine load, e.g., the throttle opening TVO. In step S2, the engine control unit 16 calculates a knock transmission coefficient Cf (IGNcyl) for each cylinder using an ignition cylinder identifying signal IGNcyl and a cylinder-specific knock (vibration) transmission coefficient table Cf ( ), and then updates the estimated knock signal S by multiplying the estimated knock signal S by the coefficient Cf (IGNcyl). The coefficient Cf (IGNcyl) is different for each cylinder and varies according to the position, rigidity, and other characteristics of the cylinder.

In order to estimate an estimated noise signal N accurately, in steps S3 and S4, the estimated noise signal N is estimated as two separate components: an estimated mechanical noise component Nk comprising vibrations that occur in the mechanical part (piston sliding noise, crankshaft rotational noise, etc.), and an estimated combustion noise component Nc comprising resonance that occurs in the combustion chamber (the combustion pressure and valves impart vibrations to the combustion chamber walls). The estimated combustion noise component Nc can be roughly divided into a first combustion vibration part caused by combustion and a second valve seating vibration part caused mainly by the seating action of the intake valves. The strength (amplitude) of the first combustion vibration part, which is caused by combustion pressure variations, is proportional to the square of the combustion pressure change rate dP/dt (where dP is the change in combustion pressure). This remains basically true whether the combustion is rapid, such as during knocking, or normal. The strength of the second valve seating vibration part caused by the valve seating action and the like is proportional to the square of dx/dt (where dx is the displacement of the valve during seating and is expressed in terms of the cam ramp speed (mm/rad), engine speed, etc.).

It is acceptable to assume that the rate dP/dt, i.e., the combustion rate, for the estimated noise signal N is substantially dependent on the engine speed and load. The ignition timing also affects the combustion rate, but it is not necessary to consider the effect of the ignition timing because the ignition timing is also generally determined based mainly on the engine speed and load. The rate dP/dt for the estimated knock signal S, i.e., the knocking combustion rate, is very large (e.g., several 1000 m/s) and is several 10 times larger than the dP/dt for the estimated noise signal N. Thus, vibrations associated with knocking combustion can be distinguished from other vibrations and knocking can be detected. The rate dx/dt is the displacement of the intake valve, which is moved by a cam and valve springs. When the valve is seated, this rate is the ramp displacement, which is substantially proportional to the engine speed. However, in the case of electromagnetically driven valves, this rate will be generally constant regardless of the engine speed. The valve seating vibrations occur largely due to the impact of the valve against the valve seat. In a direct fuel injection engine, the fuel injectors also impart vibrations directly to the combustion chamber. Therefore, these vibrations proportional to the square of dx/dt still occur. However, the magnitude of nozzle seating vibrations is substantially constant and not especially proportional to the engine speed because such nozzles are generally seated by an electromagnet or spring.

In step S3, the engine control unit 16 calculates the estimated mechanical noise component Nk of the estimated noise signal N outputted from the knock sensor 10 when knocking is not occurring by mapping the engine speed Ne onto an engine rotational speed map Nkf ( ). In step S4, the estimated combustion noise component Nc of the estimated noise signal N is estimated by mapping the engine speed Ne and the throttle opening TVO onto the engine rotational speed map Ncf (Ne).

In steps S5 and S6, the engine control unit 16 calculates the valve seating position VT (ATDC) corresponding to the intake valve closing timing based on the valve lift characteristic set by the variable valve mechanisms 12 and 14. More specifically, in step S5, the engine control unit 16 calculates a ramp position change amount RTvf (VL) based on a variable valve lift amount VL of the variable valve lift and actuation angle changing mechanism 14 and a ramp position change amount table RTvg ( ). The ramp position change amount RTvf (VL) is then set as the valve seating position VTC0 corresponding to the most retarded phase, i.e., corresponding to when the phase conversion angle of the variable valve timing control mechanism 12 in the advance direction is 0 (zero). In step S6, the intake valve closing timing (IVC), i.e., the valve seating position VT, is found by subtracting the phase conversion angle advancement value VTCT from VTC0.

In step S7, the engine control unit 16 determines if the valve seating position VT is in the knock detection interval between the knock detection start position KNS and the knock detection end position KNE. In other words, the engine control unit 16 is determined if the intake valve closing timing IVC overlaps with the knock detection interval defined by KNS and KNE.

If the engine control unit 16 determines that the valve seating position VT is in the knock detection interval, then the estimated noise signal N is updated (revised) in accordance with steps S8 to S12 (estimated noise signal updating section). More specifically, in step S8, the engine speed valve seating vibration coefficient Nvf (Ne) is calculated using the engine speed Ne and an engine speed valve seating vibration coefficient table Nvf ( ). Also, in step S8, the ramp speed coefficient RSvf (VL) is calculated based on the variable valve lift amount VL and a ramp speed coefficient table RSvf ( ), and the valve seating noise Nv is calculated by multiplying Nvf (Ne) and RSvf (VL) together.

In step S9, the valve seating cylinder relative position Vofs is found based on the variable valve lift amount VL using a lift-specific valve seating cylinder relative position table VLCf ( ). In step S10, the ignition cylinder identifying signal IGNcyl is added to the valve seating cylinder relative position Vofs to obtain the valve seating cylinder identifying signal VALcyl. In step S11, the cylinder-specific knock transmission coefficient Cf (VALcyl) is calculated based on the valve seating cylinder identifying signal VALcyl using a cylinder-specific knock transmission coefficient table Cf ( ), and the valve seating noise component Nv is updated by multiplying it by Cf (VALcyl). In step S12, the estimated mechanical noise component Nk is updated by adding the updated valve seating noise component Nv from step S11.

In step S13, the estimated noise signal N is found by adding the estimated mechanical noise component Nk and the estimated combustion noise component Nc together. If the result of step S7 was negative, then the value found in step S3 is used for Nk. If the result of step S7 was affirmative the updated value found in step S12 is used. In step S14 (the signal-to-noise ratio estimating section), the estimated signal-to-noise ratio S/N (SN), i.e., the ratio of the estimated knock signal S and the estimated noise signal N, is found.

In step S15, the engine control unit 16 determines if the signal ratio SN is less than or equal to a preset knock control threshold value SNs1 set by the knock detectability determining section 20. If the signal ratio SN is less than or equal to SNs1, then the engine control unit 16 determines that knock detection is not possible (step S16). If the signal ratio SN is greater than SNs1, then the engine control unit 16 determines that knock detection is possible (step S17).

When the engine control unit 16 determines that knocking cannot be accurately detected (step S16), the ignition timing retardation amount (amount of retardation from advance limit MBT or a set basic ignition timing) is set to a large value having a sufficient margin (excess coverage) in view of changes in the octane rating and environmental factors (such as temperature) to prevent knocking from occurring, thus avoiding degradation of the durability of the engine and discomfort for passengers. This setting is executed by the retardation amount calculating section 22 shown in FIG. 1. Table 1 shows an example of the retardation amount settings.

TABLE 1

Examples of knock retardation amounts based on operating region (engine rotational speed versus engine load) when knock control cannot be executed.

| — | 2000 rpm or less | ≧2000 rpm < 4000 rpm | ≧4000 rpm |
|---|---|---|---|
| Large throttle opening | 9 | 6 | 4 |
| Medium throttle opening | 4 | 3 | 2 |
| Throttle closed | 0 | 0 | 0 |

Thus, since the margin of the retardation amount is set to a large value such that knocking will definitely not occur regardless of individual differences and changes over time, there is the risk that under some operating conditions the ignition timing will be retarded beyond the knocking limit and degradation of fuel efficiency and output will result. This depends on the conditions, but degradation of fuel efficiency and output of approximately 1 to 5% is possible at a particular operating point (not mode fuel efficiency). In view of this issue, this embodiment conducts the determination of step S15 rigorously such that situations in which knocking control cannot be executed do not occur often. More specifically, as previously described, the estimated noise signal N of the signal ratio SN used in step S15 is divided into an estimated mechanical noise component Nk and an estimated combustion noise component Nc, and each of these is estimated in accordance with the operating state of the engine. The estimated mechanical noise component Nk is also updated according to the valve seating position VT.

In recently, the implementation of variable valve mechanisms and high-pressure fuel injectors is becoming more widely used in vehicles. Variable valve mechanisms cause a large impact to be generated in internal combustion engines in which knock occurs and change the timing at which the impact occurs. High-pressure fuel injectors are also used for direct fuel injection. These devices are sources of noise that increase the noise signal and make it more difficult to execute knock control based on the S/N ratio. Moreover, since the timing of the noises generated by the intake and exhaust valves of a variable valve mechanism fluctuates depending on the change in closing timing, particular of the intake valve. Thus, it is difficult to unambiguously determine the region where knock control cannot be executed based on the operating conditions. Therefore, this embodiment updates the estimated noise signal N in response to the intake valve closing timing as described above so that an appropriate determination of knock detectability can be conducted in accordance with the intake valve opening timing.

The main factors that affect the valve seating noise component Nv include changes in the seating energy (see Equations (1) and (2) and Table 2 discussed later) and changes in the seating timing. The change in the seating energy corresponds to the change in impact energy, which is determined by the seating speed, mass, material, spring constant of valve spring, damping forces (friction of various parts, cylinder pressure, etc.), etc. The seating speed fluctuates depending on such items as the engine speed, the cam used (when a cam switching mechanism is used), and the valve lift variable amount (when a lift and actuation angle changing mechanism is used). The other factors determining the impact energy change depending on the characteristics of the valve system, the valve resting, etc. Regarding valve resting, there are configurations in which an engine having a plurality of intake valves allows some of the intake valves to rest and configurations in which the intake valves are opened only slightly to suppress the collection of stagnant fuel. In either case, the valve resting can be accomplished by setting the cam profile of the cam switching mechanism. Depending on the cam used, a change in the cam ramp speed is sometimes included. The seating timing is a relative timing with respect to the knock detection interval. Whether or not the seating timing is within the knock detection interval changes depending on the number of cylinders, the firing order, etc.

In this embodiment, the estimated knock signal S is updated (step S2) by multiplying by a knock transmission coefficient Cf (IGNcyl) that is set for each ignition cylinder where knocking is detected. When the valve seating position VT is in the knock detection interval for that cylinder, the determination at step S7 is affirmative and the estimated noise signal N is updated (step S12, step S13) by adding the valve seating noise component Nv, which is proportional to the square of the engine speed. The valve seating noise component Nv is calculated by multiplying by a valve seating vibration coefficient Nvf (Ne) set for each cylinder where valve seating occurring. Thus, by having knock transmission coefficients and valve seating vibration coefficients for each cylinder, the signal ratio SN can be estimated accurately on a cylinder-specific basis. Since there is no need to revise the coefficient in response to the engine speed or load, costs can be reduced by simplifying the control procedure and decreasing the amount of ROM used. It is also acceptable for the valve seating vibration coefficient to be the same value as the knock transmission coefficient. When a cam switching mechanism is used, a valve seating vibration coefficient can be issued for each cam. When the ramp speed changes due to a lift and actuation angle changing mechanism, the valve seating vibration coefficient typically increases proportionally to the valve lift amount.

As previously described, the reason the estimated knock signal S and estimated noise signal N are both multiplied by coefficients is to take into account the differences in the relative positions of the cylinders with respect to the knock sensor 10 and calculate the seating energy detected by the knock sensor 10 so as to incorporate the dampening rate and resonance sensitivity associated with the particular cylinder where vibrations are occurring. The energy at the vibration source does not change much depending on the cylinder (position), but knock control is executed based on the position where the knock sensor 10 detects the vibrations. Consequently, a characteristic close to the actual signal-to-noise ratio S/N cannot be obtained unless coefficients representing the resonance, dampening, etc., of the vibration transmission path (from the cylinder to the knock sensor 10) are not established in advance for each cylinder. The signal strength at the knock sensor 10 is given by Equation (1) as follows:

$$\text{Signal strength at sensor} = (\text{transmission coefficient for particular cylinder}) \times (\text{energy of vibration source}) \quad (1)$$

The energy of the vibration source can be estimated with Equation 2, as follows:

$$\text{Energy of vibration source} = C \times (dy/dt)^2 \quad (2)$$

In Equation 2, the coefficient C is a coefficient for the particular vibration source and displacement $dy/dt$ is the displacement of the source when it is vibrating. Examples of vibration sources are shown in Table 2 below.

TABLE 2

Examples of vibration source energy types

| Vibration source | Coefficient C | Displacement dy/dt |
|---|---|---|
| Combustion | Engine-specific | Proportional to engine rpm and load |
| Normal cam | Valve-specific | Proportional to engine rpm |
| Cam switching (two cam settings: cam A and cam B) | Valve-specific | Proportional to product of engine rpm and ramp speed change coefficient (B/A when cam A is used as reference) |
| Lift continuous variation (VEL, etc.) | Valve-specific | Proportional to product of engine rpm and a set ramp speed amount coefficient |
| Electromagnetic valve (EMV, etc.) | Valve-specific | Substantially constant |
| Fuel injector | Injector-specific | Substantially constant |

The noise signal includes vibrations from a variety of vibration sources that are vibrating during the knock detection interval. The timing at which some of the vibration sources listed in Table 2 experience vibration changes relative to the knock detection interval. In particular, when valve seating noise occurs at a timing close to the intake valve closing timing, the timing at which the noise occurs and the vibrational energy change greatly in response to changes in the valve lift characteristic.

Figure 5:
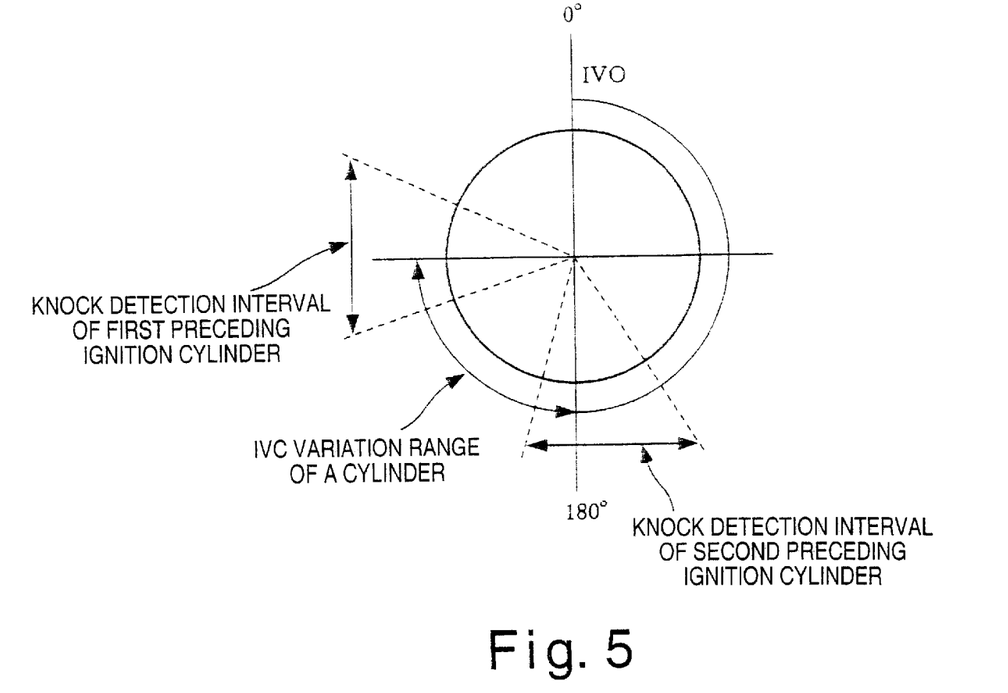
FIG. 5 is a characteristic diagram showing the relationship between the knock detection interval and the intake valve opening timings of several cylinders.

FIG. 5 shows an example of the relationship between the knock detection interval and the seating timing. FIG. 5 applies to a six-cylinder engine like that shown in FIG. 2 and illustrates which cylinders' knock detection intervals overlap with the seating timing of the intake valve (when the intake valve closes) of a particular cylinder when the IVC of that cylinder is changed. Here, the knock detection interval ranges from approximately 10 to 70 degrees ATDC and the IVC variation range is from 0 to 90 degrees ATDC. As shown in FIG. 5, the cylinder (position) whose valve seating timing is in the knock detection interval of the targeted cylinder can be determined based on the valve timing, i.e., the IVC setting. When there is no mechanism for varying the valve timing, the valve seating position is always constant with respect to the crank angle. Therefore, the relationship between the valve seating timing and the knock detection intervals cannot be changed if the knock detection intervals are also fixed.

As supplementary information, Table 3 shows an example of the mixing ranges (overlapping range) of the IVC with respect to the knock detection intervals when the knock detection interval is between 10 to 70 degrees ATDC in a V-6 engine like that shown in FIG. 2.

TABLE 3

| Noise source | Range of valve timing settings that overlap with detection interval | Circumstances under which setting is used | Relationship with ignition cylinders | Relative position |
|---|---|---|---|---|
| IVC | −50 to 20 deg. ABDC | Early closing identical | Second subsequent ignition cylinder | Same bank |
| | 70 to 140 deg. ABDC | High output, idle, late closing to id | First subsequent cylinder | Opposite bank |

The exhaust valve closing timing EVC is seldom changed in response to the operating conditions, and thus, does not affect the knock detectability. Conversely, the intake valve closing timing IVC is often changed in response to the operating conditions by the variable valve mechanism, and thus, has a relative large effect on the knock detectability in comparison with the exhaust valve closing timing EVC.

Second Embodiment

Figure 6:
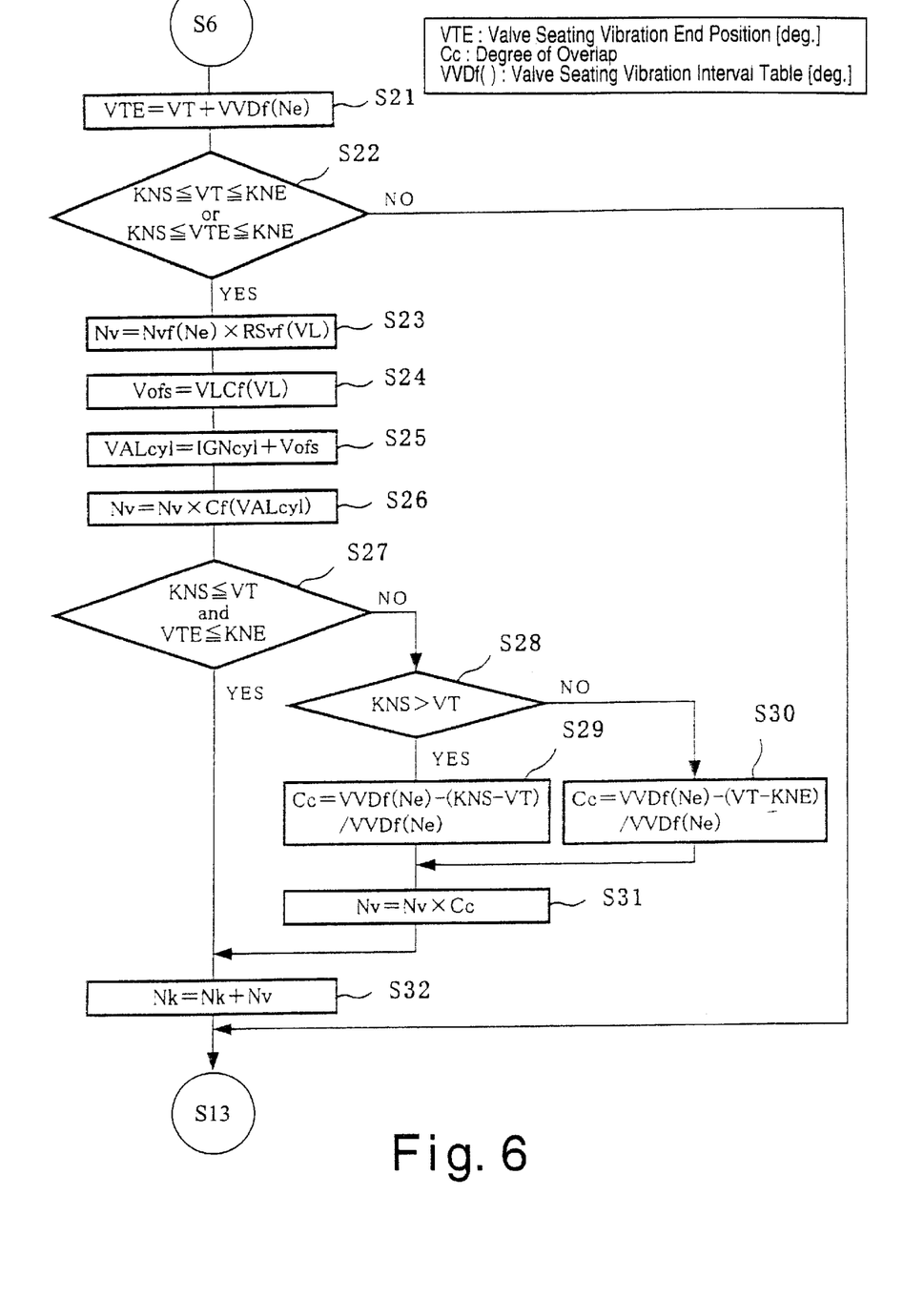
FIG. 6 is a flowchart showing the control steps executed by the knock control system in accordance with a second embodiment of the present invention.

FIG. 6 is a flowchart showing a portion of the control steps executed in a second embodiment of the present invention. The steps shown in FIG. 6 are substituted for steps S7 to S12 of the flowchart shown in FIG. 4 of the first embodiment. In other words, the other control steps for this second embodiment are the same as steps S1 to S6 and steps S13 to S17 of the first embodiment. While the first embodiment determines in a simple manner if the valve seating start position VT is in the knock detection interval, the second embodiment further increases the precision with which the estimated noise signal N is estimated. It accomplishes this by calculating the valve seating vibration interval, calculating the degree of overlap between the valve seating vibration interval and the knock detection interval, and updating the noise signal N in accordance with this degree of overlap.

More specifically, in step S21, a valve seating vibration interval VVDf (Ne) is calculated based on the engine rotational speed Ne using a valve seating vibration interval table VVDf ( ), while a valve seating vibration end position VTE is calculated by adding the valve seating vibration interval VVDf (Ne) to the valve seating position VT.

In step S22, the engine control unit 16 determines if the valve seating vibration interval VVDf (Ne) overlaps the knock detection interval, which ranges from KNS to KNE. More specifically, the engine control unit 16 determines if the valve seating position VT and/or the valve seating vibration end position VTE lies between the knock detection start position KNS and the knock detection end position KNE.

If the result of step S22 is affirmative, then the engine control unit 16 proceeds to step S23. The processing executed in steps S23 to S26 is the same as that executed in steps S8 to step S11 in FIG. 4. More specifically, in step S23, the engine speed valve seating vibration coefficient Nvf (Ne) is calculated using the engine rotational speed Ne and an engine speed valve seating vibration coefficient table Nvf ( ), the ramp speed coefficient RSvf (VL) is calculated based on the variable valve lift amount VL and a ramp speed coefficient table RSvf ( ), and the valve seating noise component Nv is estimated by multiplying Nvf (Ne) and RSvf (VL) together. In step S24, the valve seating cylinder relative position Vofs is found based on the variable valve lift amount VL using a lift-specific valve seating cylinder relative position table VLCf ( ). In step S25, the ignition cylinder identifying signal IGNcyl is added to the valve seating cylinder relative position Vofs to obtain the valve seating cylinder identifying signal VALcyl. In step S26, the cylinder-specific knock (vibration) transmission coefficient Cf (VALcyl) is calculated based on the valve seating cylinder identifying signal VALcyl and a cylinder-specific knock (vibration) transmission coefficient table Cf ( ), and the valve seating noise component Nv is updated/revised by multiplying it by Cf (VALcyl).

In step S27, the engine control unit 16 determines if the valve seating vibration interval defined by VT and VTE is completely contained within the knock detection interval defined by KNS and KNE. More specifically, the engine control unit 16 determines if VT is greater than or equal to KNS, and if VTE is less than or equal to KNE.

If the result of step S27 is negative, then the engine control unit 16 proceeds to steps S28 to S31, where the valve seating noise component Nv is revised/updated in response to the degree of overlap between the knock detection interval (KNS to KNE) and the valve seating vibration interval (VT to VTE).

More specifically, if VT is less than KNS, i.e., if the seating start position VT is not inside the knock detection interval, the engine control unit 16 proceeds from steps S28 to S29, where the degree of overlap Cc between the knock detection interval (KNS to KNE) and the valve seating vibration interval (VT to VTE) is calculated based on the amount (KNS−VT) by which the seating start position VT precedes the detection start position KNS. Meanwhile, if VT is greater than or equal to KNS, i.e., if the seating start position VT is within the knock detection interval, then the engine control unit 16 proceeds from steps S28 to step S30, where the degree of overlap Cc between the knock detection interval (KNS to KNE) and the valve seating vibration interval (VT to VTE) is calculated based on the amount (VT−KNS) by which the detection start position KNS precedes the seating start position VT.

In step S31, the valve seating noise component Nv is revised/updated by multiplying it by the degree of overlap Cc. In step S32, the mechanical noise component Nk is revised/updated by adding the valve seating noise component Nv calculated in step S26 or step S31. Afterwards, the engine control unit 16 proceeds to steps S13 to S17 of FIG. 4 and executes the following steps as previously described: estimates the estimated noise signal N (step S13), estimates the signal ratio SN (step S14), compares the signal ratio SN with the determination threshold value SNs1 (step S15), and determines if an accurate knock signal can be detected (step S16, step S17).

Figure 7:
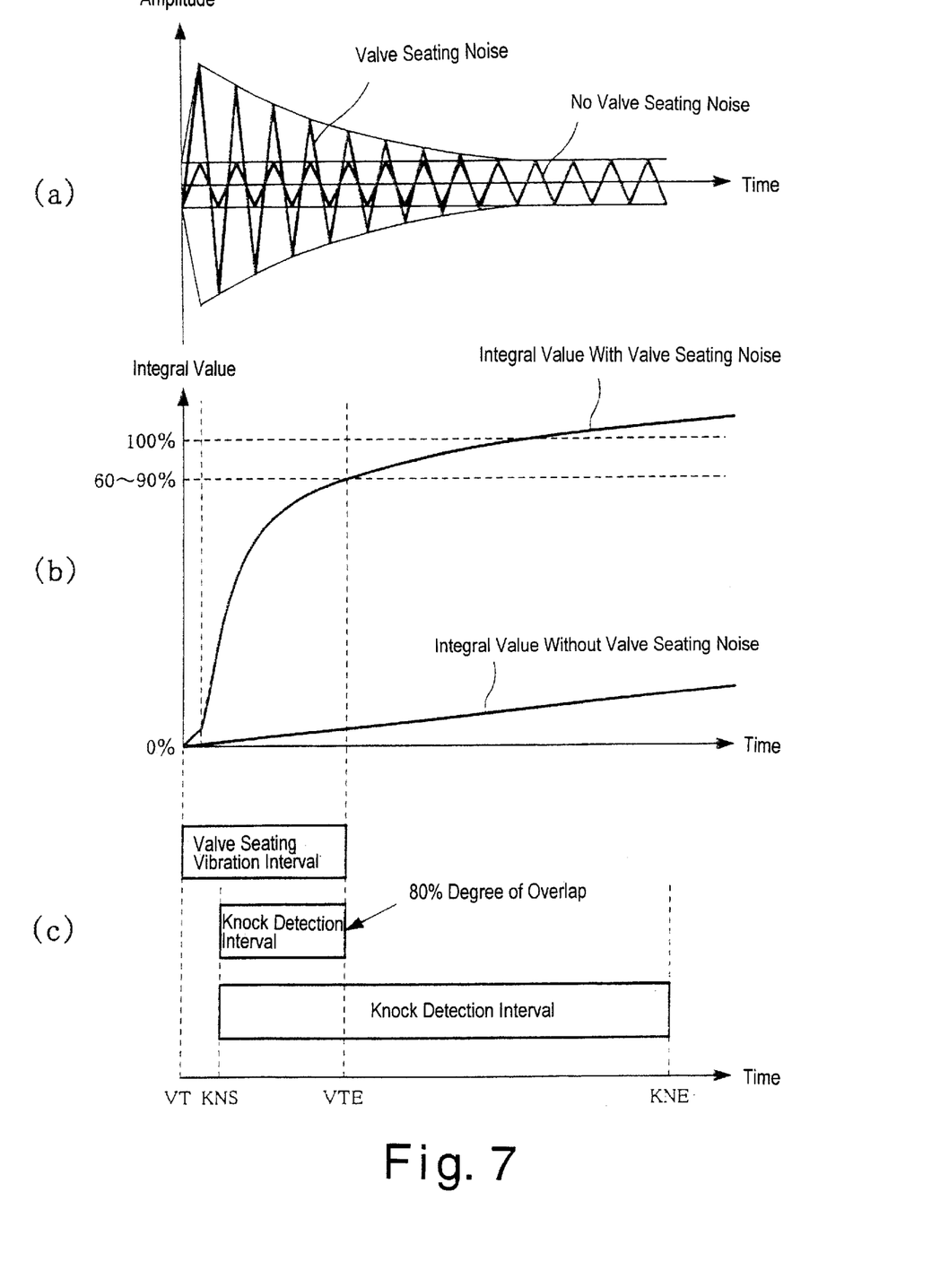
FIG. 7 illustrates the degree of overlap between the knock detection interval and the valve seating vibration interval.

In portion (a) of FIG. 7, a waveform characteristic is illustrated to show a valve seating vibration. As shown in portion (b) of FIG. 7, it is acceptable to assume that the valve seating vibration interval corresponds to the period until the integral value of the waveform reaches 60 to 90%. Portion (c) of FIG. 7 shows the degree of overlap between the valve seating vibration interval and the knock detection interval.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-170744. The entire disclosure of Japanese Patent Application No. 2002-170744 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A knock control system for an internal combustion engine comprising:
   a variable valve mechanism configured and arranged to change at least an intake valve closing timing;
   a knock detector configured to output a knock signal indicative of the engine knocking condition during a knock detection interval;
   a signal-to-noise ratio estimating section configured to estimate a signal ratio based on at least one of an engine rotational speed and an engine load, the signal ratio being a ratio of an estimated knocking signal estimated when the engine knocking condition is occurring and an estimated noise signal estimated when the engine knocking condition is not occurring;
   an estimated noise signal updating section configured to update the estimated noise signal depending upon on the intake valve closing timing;
   a knock detectability determining section configured to determine if the knock signal can be detected or not based on the signal ratio; and
   a knock control section configured to execute knock control based on the knock signal when the knock detectability determining section determines the knock signal can be detected.

2. The knock control system as recited in claim 1, wherein the knock control section is further configured to feedback control an ignition timing based on the knock signal; and
   further comprising a retardation amount setting section configured to set an amount of retardation of the ignition timing based on at least one of the engine rotational speed and the engine load when the knock detectability determining section determines that the knock signal cannot be detected.

3. The knock control system as recited in claim 2, wherein the estimated noise signal updating section is further configured to:
   calculate an estimated mechanical noise component based on at least the engine rotational speed;
   calculate an estimated combustion noise component based on at least one of the engine rotational speed and the engine load;
   calculate a valve seating noise component based on at least the engine rotational speed;
   update the estimated mechanical noise component based on the valve seating noise to produce an updated estimated mechanical noise; and
   calculate the estimated noise signal based on the updated estimated mechanical noise and the estimated combustion noise.

4. The knock control system as recited in claim 3, wherein the estimated noise signal updating section is further configured to:
   estimate an estimated valve seating position corresponding to the intake valve closing timing; and
   update the estimated noise signal if the estimated valve seating position is within the knock detection interval.

5. The knock control system as recited in claim 3, wherein the estimated noise signal updating section is further configured to:
   estimate a valve seating vibration region based on the engine rotational speed and an intake valve lift characteristic;
   calculate a degree of overlap between the valve seating vibration region and the knock detection interval; and
   update the estimated noise signal in accordance with the degree of overlap between the valve seating vibration region and the knock detection interval.

6. The knock control system as recited in claim 1, wherein the estimated noise signal updating section is further configured to:
   calculate an estimated mechanical noise component based on at least the engine rotational speed;
   calculate an estimated combustion noise component based on at least one of the engine rotational speed and the engine load;
   calculate a valve seating noise component based on at least the engine rotational speed;
   update the estimated mechanical noise component based on the valve seating noise to produce an updated estimated mechanical noise; and
   calculate the estimated noise signal based on the updated estimated mechanical noise and the estimated combustion noise.

7. The knock control system as recited in claim 2, wherein the estimated noise signal updating section is further configured to:
   estimate an estimated valve seating position corresponding to the intake valve closing timing; and
   update the estimated noise signal if the estimated valve seating position is within the knock detection interval.

8. The knock control system as recited in claim 2, wherein the estimated noise signal updating section is further configured to:
   estimate a valve seating vibration region based on the engine rotational speed and an intake valve lift characteristic;
   calculate a degree of overlap between the valve seating vibration region and the knock detection interval; and
   update the estimated noise signal in accordance with the degree of overlap between the valve seating vibration region and the knock detection interval.

9. The knock control system as recited in claim 1, wherein the estimated noise signal updating section is further configured to:
   estimate an estimated valve seating position corresponding to the intake valve closing timing; and
   update the estimated noise signal if the estimated valve seating position is within the knock detection interval.

10. The knock control system as recited in claim 1, wherein the estimated noise signal updating section is further configured to:
   estimate a valve seating vibration region based on the engine rotational speed and an intake valve lift characteristic;
   calculate a degree of overlap between the valve seating vibration region and the knock detection interval; and
   update the estimated noise signal in accordance with the degree of overlap between the valve seating vibration region and the knock detection interval.

11. A knock control system comprising:

variable valve means for changing at least an intake valve closing timing;

knock detection means for detecting an engine knocking condition and for outputting a knock signal indicative of the engine knocking condition during a knock detection interval;

signal-to-noise ratio estimating means for estimating a signal ratio based on at least one of an engine rotational speed and an engine load, the signal ratio being a ratio of an estimated knocking signal estimated when the engine knocking condition is occurring and an estimated noise signal estimated when the engine knocking condition is not occurring;

estimated noise signal updating means for updating the estimated noise signal based on the intake valve closing timing;

knock detectability determining means for determining if the knock signal can be detected or not based on the signal ratio; and knock controlling means for executing knock control based on the knock signal when the knock detectability determining section determines the knock signal can be detected.

12. A method of controlling engine knocking comprising:

detecting an engine knocking condition and for outputting a knock signal indicative of the engine knocking condition during a knock detection interval;

estimating an estimated knocking signal based on the knock signal when the engine knocking condition is occurring;

estimating an estimated noise signal that is indicative of noise occurring when the engine knocking condition is occurring;

updating the estimated noise signal based on an intake valve closing timing relative to the knock detection interval;

estimating a signal ratio based on at least one of an engine rotational speed and an engine load, the signal ratio being a ratio of an estimated knocking signal when the engine knocking condition is occurring and an estimated noise signal when the engine knocking condition is not occurring;

determining if the knock signal can be detected or not based on the estimated noise signal;

an estimated noise signal calculation section configured to calculate an estimated noise signal based on the intake valve closing timing; and executing knock control based on the knock signal when the knock signal exceeds a prescribed level that was detected.

13. The method as recited in claim 12, wherein the executing of the knock control uses feedback to control an ignition timing based on the knock signal; and further comprising setting an amount of retardation of the ignition timing based on at least one of the engine rotational speed and the engine load upon a determination that the knock signal cannot be detected.

14. The method as recited in claim 12, wherein the estimating of the signal ratio further comprises:

calculating an estimated mechanical noise component based on at least the engine rotational speed;

calculating an estimated combustion noise component based on at least one of the engine rotational speed and the engine load;

calculating a valve seating noise component based on at least the engine rotational speed;

updating the estimated mechanical noise component based on the valve seating noise to produce an updated estimated mechanical noise; and calculating the estimated noise signal based on the updated estimated mechanical noise and the estimated combustion noise.

15. The method as recited in claim 12, wherein the updating of the estimated noise signal further comprises:

estimating an estimated valve seating position corresponding to the intake valve closing timing; and updating the estimated noise signal if the estimated valve seating position is within the knock detection interval.

16. The method as recited in claim 12, wherein the updating of the estimated noise signal further comprises:

estimating a valve seating vibration region based on the engine rotational speed and an intake valve lift characteristic;

calculating a degree of overlap between the valve seating vibration region and the knock detection interval; and updating the estimated noise signal in accordance with the degree of overlap between the valve seating vibration region and the knock detection interval.

* * * * *